(No Model.)  
2 Sheets—Sheet 1.

C. W. CRARY.
CHUCK.

No. 299,964.  
Patented June 10, 1884.

Witnesses:  
J. B. Halpenny  
James Lowth

Inventor:  
Cushman W. Crary  
per F. F. Warner —  
his Attorney.

(No Model.) 2 Sheets—Sheet 2.

C. W. CRARY.
CHUCK.

No. 299,964. Patented June 10, 1884.

Witnesses:
J. B. Halpenny
James Louth

Inventor:
Cushman W. Crary
per F. F. Warner
his Attorney.

UNITED STATES PATENT OFFICE.

CUSHMAN W. CRARY, OF CHICAGO, ILLINOIS.

CHUCK.

SPECIFICATION forming part of Letters Patent No. 299,964, dated June 10, 1884.

Application filed November 10, 1883. (No model.)

*To all whom it may concern:*

Be it known that I, CUSHMAN W. CRARY, residing at Chicago, in the county of Cook and State of Illinois, have invented certain new and useful Improvements in Chucks, of which the following, in connection with the accompanying drawings, is a specification.

Figure 1:
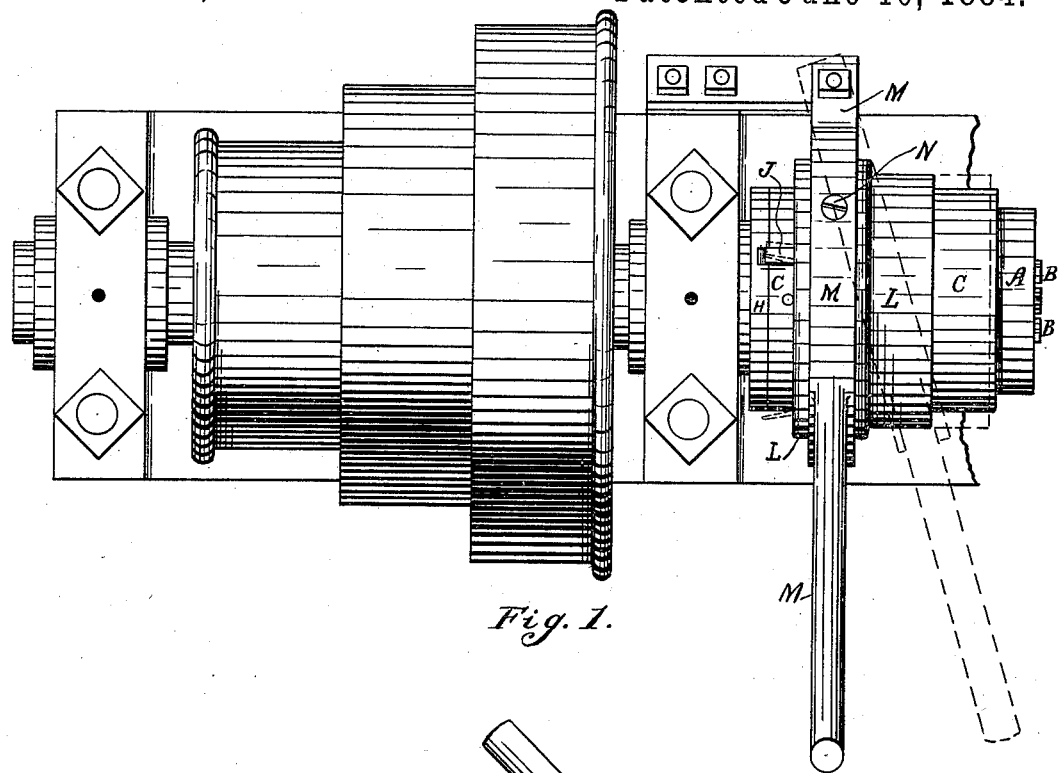
Figures 2, 3:
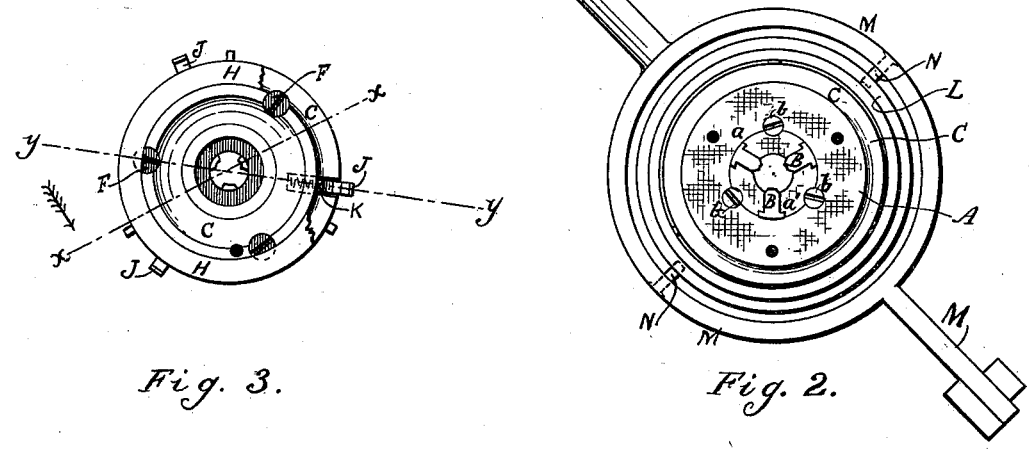
Figure 4:
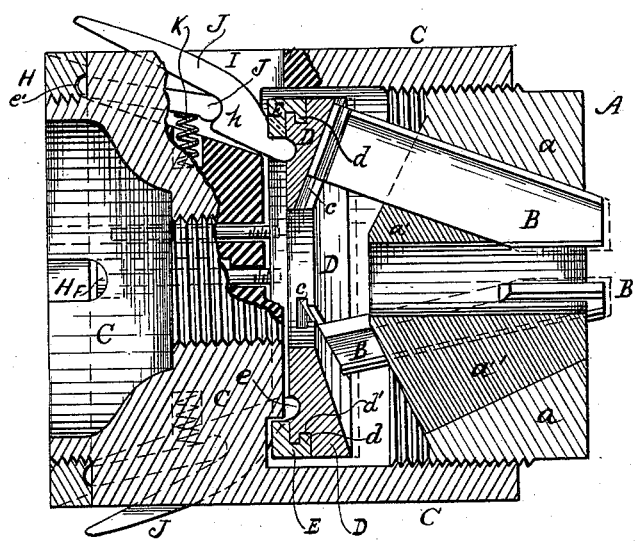
Figure 6:
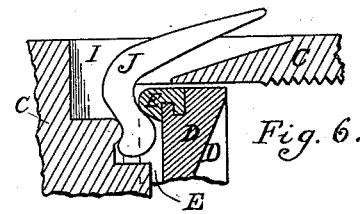
Figure 5:
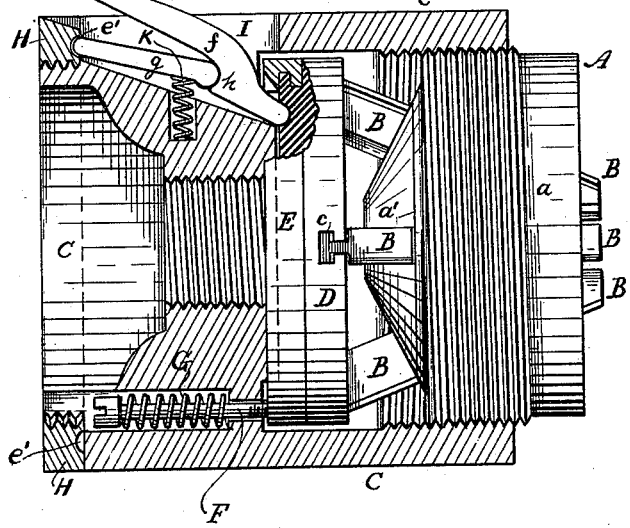

In the drawings, Figure 1 is a side view of a chuck embodying my improvements, and mounted on that part of a lathe intended to receive and rotate it. Fig. 2 is an end view of the front end of the chuck. Fig. 3 is an end view of the rear end of the chuck. Fig. 4 is a section in the plane of the line $x\ x$ of Fig. 3, viewed in the direction indicated by the arrow there shown. Fig. 5 is a section in the plane of the line $y\ y$ of Fig. 3, viewed in the opposite direction; and Fig. 6 is a sectional detail showing a modification in the form of the levers.

Like letters of reference indicate like parts.

The object of my invention is to provide improved means for the purpose of making the final pinch or clamp upon the pipe, tube, or other article placed in the chuck to be cut or turned. I also aim to improve the chuck in other respects, all of which will hereinafter more fully appear.

A represents the head of the chuck, and B B are the jaws. In the example shown the head is made in two parts, $a$ and $a'$, the part $a'$ being tapering in form and fitting into the part $a$, as indicated in Fig. 4. These two parts I connect by means of screws $b\ b$, as indicated in Fig. 2. The part $a'$ is grooved on its tapering or curvilineal face to receive the jaws B B, which are capable of a sliding movement in the said grooves.

C is the case or shell of the chuck. This shell is internally screw-threaded to receive the head A, which is externally screw-threaded, as shown in Figs. 4 and 5.

D is a sliding ring, having in it T-shaped or dovetailed grooves $c\ c$, into which the inner ends of the jaws B B are fitted.

E is a sliding ring having a shoulder, $d$, entering a corresponding annular groove, $d'$, in the ring D, so that the latter ring may turn, although thus jointed to the ring E, and so that the said rings may be drawn back and forth together in the shell. A groove, $e$, is made in one side of the ring D.

F F are headed screw-pins entering the ring E, and G G are open spiral springs surrounding the said screw-pins and arranged between the heads thereof and a shoulder in the shell C, as indicated in Fig. 5.

H is a ring screwed upon the rear end of the shell and forming a detachable part thereof, and $e'$ is a groove in the ring H.

I I are sockets or pockets in the shell C.

J is a lever or toggle consisting of two parts, $f$ and $g$. The forward end of the part $f$ enters the groove $e$, and the rear end of the part $g$ rests in the groove $e'$. The part $g$ also bears against the part $f$, as shown at $h$ in Figs. 4 and 5. When the parts $f$ and $g$ are arranged in this manner, the outer end of the part $f$ stands or projects somewhat out from the shell C, and the lever is supported only by reason of its contact with the rings D and H, and the said lever, between its bearing ends, stands somewhat up or away from the shell C, or from the bottoms of the sockets I I, as shown. These levers, however, may be further supported near their centers by means of springs K K; but these springs are not absolutely essential, and are only employed to insure the parts $f$ and $g$ from standing in a "dead-center," as will hereinafter more fully appear.

L is a sliding ring on the shell C, and M is a pivoted lever. N N are screws passing through the lever M into a groove in the ring L. By moving the lever M toward the rear end of the chuck the ring L will be moved in the same direction, and in moving in that direction it will strike and compress the projecting ends of the levers J J, and by this means the ring D will be pushed forward slightly with great force, owing to the toggle-like structure of the said levers. When the ring L is withdrawn or moved in the opposite direction, the springs G G will retract the ring D, and the levers will be set to be again compressed. The springs K K are merely auxiliary to the springs G G in causing the levers to rise after being released.

It will be perceived from the foregoing description that the jaws B B will be moved inward and outward by the movement of the ring D, and that their outer ends will approach each other as they move outward, and move from each other as they move inward, in the usual manner, it being also understood that this movement of the outer ends of the jaws B B to and from each other will also be effected by turning the head A in the shell C.

To use this chuck, I place the tube, rod, or bar to be cut or turned between the jaws B B, first opening them sufficiently for that purpose by turning the head A in the proper direction. After having placed the tube, rod, or bar between the jaws, I set the latter down upon it by turning the head A in the opposite direction; but, to make the final or firm pinch upon the rod, I move the ring L back over the ends of the levers J J in the manner described.

By the means described the length of the chuck is much less than usual in chucks in which provision is made for a primary and a final clamping of the part to be operated upon, and hence the true center is more easily preserved.

In the modification shown in Fig. 6 each lever for setting the ring D forward is made in one piece instead of two, and is fulcrumed against the shell and bears against the ring D, and its exposed end extends in the opposite direction from that of the lever made in two parts, the features of construction which are common to all of the said levers being that none are fastened to the chuck, but are simply seated therein, so as to perform their functions in the manner described.

Having thus described my invention, what I claim as new, and desire to secure by Letters Patent, is—

1. A chuck in which are combined an internal sliding ring in connection with the jaws, a set of levers, J J, the shell, and an external sliding ring for depressing the said levers, substantially as and for the purposes specified.

2. The combination, in a chuck, of the threaded head A, the sliding rings D and E, constructed and arranged together, substantially as specified, and in connection with the jaws, the pins F F, the springs G G, the external sliding ring L, the shell C, internally-threaded to correspond to the threaded head, and a set of levers for advancing the said ring L, substantially as and for the purposes specified.

In testimony that I claim the foregoing as my own, I hereto affix my signature in presence of two witnesses.

CUSHMAN W. CRARY.

Witnesses:
F. F. WARNER,
J. B. HALPENNY.